United States Patent
Beddies

[19]

[11] Patent Number: 6,012,483
[45] Date of Patent: Jan. 11, 2000

[54] SWITCH-OVER VALVE HAVING PIVOT AXLE ARTICULATED CLOSURE WINGS

[75] Inventor: Uwe Beddies, Hemmingen, Germany

[73] Assignee: H. Meinecke AG, Laatzen, Germany

[21] Appl. No.: 09/061,728

[22] Filed: Apr. 17, 1998

[30] Foreign Application Priority Data

Apr. 18, 1997 [DE] Germany ............................ 197 17 726

[51] Int. Cl.[7] ................................................. F16K 15/00
[52] U.S. Cl. ........................................ 137/512.1; 251/212
[58] Field of Search .......................... 137/512.1; 251/212

[56] References Cited

U.S. PATENT DOCUMENTS

| | | | |
|---|---|---|---|
| 1,743,731 | 1/1930 | Scott | 251/212 |
| 2,270,433 | 1/1942 | Goffredo | 251/212 |
| 2,390,150 | 12/1945 | Johnson et al. | 251/212 |
| 3,072,141 | 1/1963 | Wheeler | 137/512.1 |
| 3,533,438 | 10/1970 | Smith | 137/512.1 |
| 3,678,958 | 7/1972 | Satterwhite et al. | 137/512.1 |
| 4,043,358 | 8/1977 | Sliski | 137/512.1 |
| 4,196,745 | 4/1980 | Schutzer | 137/512.1 |
| 4,321,944 | 3/1982 | Schutzer | 137/512.1 |
| 4,585,026 | 4/1986 | Norton | 251/212 |

*Primary Examiner*—Denise L. Ferensic
*Assistant Examiner*—Joanne Y. Kim
*Attorney, Agent, or Firm*—Flanagan & Flanagan; John R. Flanagan; John K. Flanagan

[57] ABSTRACT

A switch-over valve for a compound water meter includes an annular-shaped housing defining an annular valve seat and a central throughflow cross section, a pivot extending across the housing and supported at opposite ends in opposed portions of the housing, a closure member formed by a divided flap having a pair of wings disposed along opposite longitudinal sides of the pivot and articulated by the pivot for movement between opened and closed positions relative to the annular valve seat and the central throughflow cross section and a spring disposed about the pivot biasing the wings toward the closed position. The two wings of the divided flap are connected hinge-like one with the other along and via the pivot which extends along and in the region of division of the flap. The divided flap, due to its construction, has gaps along its region of division and along the pivot which are covered by a flat flexible seal disposed on an upstream side of the divided flap. The pivot can be a common axle or a pair of separate pivot axles arranged in side-by-side relationship each mounting one of the wings.

22 Claims, 4 Drawing Sheets

SWITCH-OVER VALVE HAVING PIVOT AXLE ARTICULATED CLOSURE WINGS

CROSS REFERENCE TO RELATED APPLICATION

Reference is hereby made to the following copending application dealing with subject matter related to the present invention: "Compound Water Meter Having Impeller Rotatably Supported Between Main Meter Measuring And Switch-Over Valve Insets" by Uwe Beddies, U.S. Ser. No. 09/062,454, filed Apr. 17, 1998, which copending application is assigned to the same assignee as this application.

BACKGROUND OF THE INVENTION

1. Field of the Invention

The present invention generally relates to a compound water meter of the type having main and secondary meter devices and a switch-over valve for controlling switching in and out of the main meter device and, more particularly, is concerned with switch-over valve having pivot axle articulated closure wings extending across the throughflow cross section of the compound water meter.

2. Description of the Prior Art

Compound water meters are used in cases in which the measuring range of a simple meter is not sufficient to cover all throughflows which might occur. These compound water meters include a large water meter as the main meter device, a house water meter as a secondary meter device, and a switch-over valve. The switch-over valve controls the switching in and out of the main meter device, which as a rule, is realized as a Woltmann meter and assumes volume measurement only for relatively large predetermined throughflows in addition to the secondary meter device.

Compound water meters are known in which the switchover valve is implemented as a weight-loaded hinged flap, as disclosed in U.S. Pat. No. 4,100,800, which upon being completely opened gates the through-flow cross section. The weight-loaded hinged flap swivels in the process about a pivot being laterally offset from the throughflow cross section. The disadvantage of this configuration is that for the pivoting of the hinged flap to occur much volume is required which leads to long and heavy compound water meters. Furthermore, complicated profile seals are required for the valve seat.

Furthermore are known compound water meters of the above-cited type, for example from German patent document Nos. DE 37 32 703 A1, DE 37 40 531 A1 or DE 39 24 147 C1. In the case of these meters, the closure member of the switch-over valve is guided translationally on an axle located centrally in the direction of flow, and loaded with a spring which presses it counter to the direction of flow into contact on a valve seat. Starting at a predetermined throughflow quantity, the closure member moves away from the valve seat while overcoming the spring force and is displaced in the direction of flow. Thereby an annular throughflow cross section is enabled.

Switch-over valves structured in this way have a smaller space requirement compared to the above-cited prior art but are still rather long, which has a negative effect on the length and the weight of the compound water meter. In addition, these known switch-over valves are complicated and thus expensive since they are built from a relatively large number of components and require profile seals for their correct functioning. Further disadvantages are that in their open position they constrict the flow cross section and consequently cause pressure losses, which are not insignificant, and are only suitable as check valves to a limited extent.

SUMMARY OF THE INVENTION

The present invention provides a compound water meter of the above-cited type which overcomes the aformentioned advantages by utilizing a switch-over valve that is structured very simply, requires limited space and, in its open position, causes low pressure losses.

Accordingly, the present invention is directed to a changeover or switch-over valve for a compound water meter. The switch-over valve comprises an annular-shaped housing defining an annular valve seat and a central throughflow cross section, a pivot extending across the housing and supported at opposite ends in diametrically opposed portions of the housing, a closure member in the form of a divided flap having a pair of wings disposed along opposite longitudinal sides of the pivot and articulated by the pivot for movement between opened and closed positions relative to the annular valve seat and central throughflow cross section, and means for biasing the wings of the divided flap in a direction counter to a normal direction of flow through the throughflow cross section of the housing to the closed position preventing flow through the throughflow cross section but upon flow through the throughflow cross section of the housing exceeding a predetermined limit the biasing means also adapted for permitting the wings to move toward the opened position enabling flow through the throughflow cross section. The two wings of the divided flap are connected hinge-like one with the other along and via the pivot which extends along a region of division of the flap. The flap, due to its divided construction, has gaps along its region of division and along the pivot. The gaps are covered by a flat seal on an upstream side of the flap in the region of the pivot. In a first embodiment, the pivot is a single or common pivot axle for each wing, whereas in a second embodiment the pivot is a pair of pivot axles disposed in side-by-side parallel relationship such that a separate pivot axle is provided for each of the wings.

In view that the closure member of the switch-over valve is a flap divided into two wings and that both wings pivot about a common axle or pair of side-by-side pivot axles, the flow through the main meter device of the compound water meter is enabled without the closure member being moved translationally or swiveled out completely. Both wings require less volume in their open position than previously known switch-over valves. This lower volume requirement can be utilized for shortening the overall length of a compound water meter.

The switch-over valve of the present invention also produces significantly lower pressure losses than the prior art switch-over valves (for example of German patent document No. DE 37 32 703 A1) in which the closure members in their open position remain in the flow. In the present invention, the closure member of the switchover valve also remains continuously in the flow, however as the wings open the area of the closure member flowed against decreases such that the pressure loss becomes increasingly smaller and is extremely low when the wings of the closure member have reached a completely opened position.

Due to the manner of articulation of the wings of the divided flap on the pivot axle(s), the flap has gaps in its region of division which could cause a creeping flow and thus create measuring errors. In order to avoid this, the flap is covered at least in this region on its upstream side with a flat seal.

In an advantageous embodiment of the switch-over valve of the present invention, the flat seal does not only extend in the region of the pivot axle(s) but, with the flap closed, it makes contact on the annular valve seat, forming a sealing relationship therewith. For providing a tight seat of the divided closure member only one seal is required which can be produced simply of a flat material. Other constructions must use more than one profile seal which, moreover, must be special seals.

In a further advantageous embodiment of the switchover valve of the present invention, the flat seal is secured form-fittingly on the divided flap. For this purpose nubs are provided on the wings of the divided flap and longitudinal holes are provided in the flat seal receiving the nubs for guiding movement of the flat seal toward and away from its sealing relationship with the annular valve seat. These longitudinal holes extend in a direction perpendicular to the pivot axle. Through this arrangement the flat seal is securely fixed on the upstream side of the divided flap. But this advantage is only of secondary importance. More significant is that due to this construction the flat seal is not stretched when the wings are opened but rather is only flexed. Through the flexing of the flat seal about the pivot axle, it becomes shortened, in a relative sense, on the wings, i.e. it slides away from their edges. It is for this reason that the flat seal is provided with the longitudinal holes whose length corresponds to the relatively shortened path of the flat seal on the wings. In this way the longitudinal holes permit a fold-free guidance of the flat seal on the nubs of the wings of the closure member.

The simple flat seal employed by the switch-over valve of the present invention is absolutely tight even with reverse flow when the switch-over valve is to operate as a check valve. In order to ensure this function, in the region of the pivot axle a stationary web is provided upstream of the flat seal. The flat seal is supported on the stationary web so that, with the flap closed, the flat seal is always in tight contact on the flap and cannot be pushed away from the flap by reverse flow.

According to a further characteristic of the switchover valve of the present invention, the biasing means is a spring disposed about one pivot axle such that the wings of the divided flap are spring-loaded by spring forces about the pivot axle in the direction of the closed position. One or several springs can be used. At low throughflow, the spring force moments are sufficient to maintain the valve closed. At large throughflow, as a result of the pressure difference on the closure member large opening force moments are produced which overcome the closing spring force moments causing the wings to open and to keep them opened. Since the spring force moments become greater as the opening angles of the wings increase, the sites where the springs transfer their force moments onto the wings have grooves in which ends of the springs are guided in a manner which results in reducing the magnitude of the spring force moments. This guidance is implemented such that the pivot angle of the spring ends with increasing opening of the wings remain behind their pivot angle. Through this measure the increase of the spring force moments during the opening of the wings is compensated for or is at least decreased.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
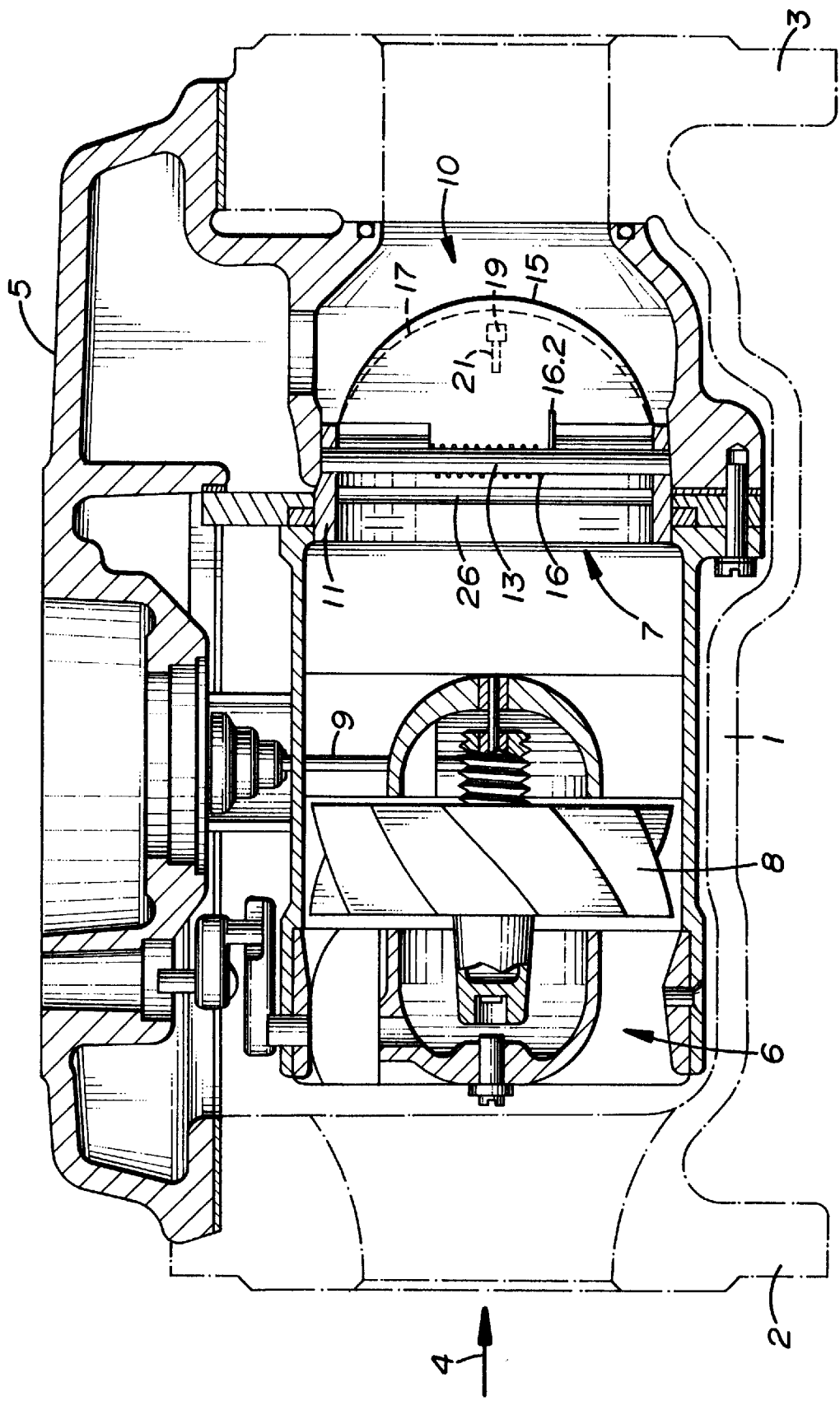
FIG. 1 is a longitudinal sectional view through a compound water meter having a switch-over valve of the present invention installed therein and shown in an opened position.

Referring to the drawings and particularly to FIG. 1, there is illustrated in phantom outline form a main housing, generally designated 1, of a main meter device of a compound water meter having two flanges 2, 3 for a connection to a pipeline. The direction of flow through the main meter housing 1 of the compound water meter is indicated by an arrow 4.

As the secondary meter device of the compound water meter, which forms no part of the present invention and so is not shown in the drawings, a conventional standard house water meter may be used, which via connection trunks is fastened on the outside of the main housing 1 of the main meter device, such as is well-known for example from German patent document No. DE 37 32 703 A1.

The main housing 1 of the main meter device of the compound water meter is provided with a head opening which is closed with a housing cover 5. On this housing cover 5 are suspended a main meter measuring inset 6 as well as a change-over or switch-over valve inset 7. These assemblies 5, 6, 7 can be set into and removed from the main meter housing 1 as a unit without any problems. The main meter measuring inset 6 includes in known manner a Woltmann measuring wing 8, whose rotation is transmitted via a shaft 9 to a conventional counter, which forms no part of the present invention and so is not depicted in the drawing. Since measuring insets of this type are known, a description of further details will be omitted here. The switch-over valve inset 7 is disposed at the downstream end of the main meter measuring inset 6 where it is securely connected with the measuring inset 6. The switch-over valve inset 7 is spring-loaded counter to the direction of flow, indicated by arrow 4, to normally assume a closed position blocking the flow through the main meter device, but upon the flow reaching a predetermined pressure limit the switch-over valve inset 7 enables flow through the main meter device.

Referring to FIGS. 2 to 5, the switch-over valve inset 7 takes the form of a first embodiment of a changeover or switch-over valve 10 of the present invention which includes an annular-shaped housing 11 defining a central circular throughflow cross section and having an interior continuous flange forming an annular valve seat 12, a pivot axle 13 extending across the diameter of the housing 11 and supported at opposite ends in diametrically opposed portions of the housing 11, and a divided flap having a pair of wings 14, 15 disposed along opposite longitudinal sides of the pivot axle 13 and articulated by the pivot axle 13 for movement between opened and closed positions relative to the annular valve seat 12 and the central throughflow cross section as a closure member of the switch-over valve 10. For mounting to the pivot axle 13, the wings 14, 15 of the divided flap are provided with pairs of eyelets 14.1, 14.2 and 15.1, 15.2. Eyelets 14.1, 15.2 of the respective wings 14, 15 are disposed side-by-side one another as are eyelets 14.2, 15.1 of the respective wings 14, 15. The eyelets 14.1, 14.2 and 15.1, 15.2 define hollow bores which when aligned with one another allow the pivot axle 13 to penetrate therethrough.

Figure 2:
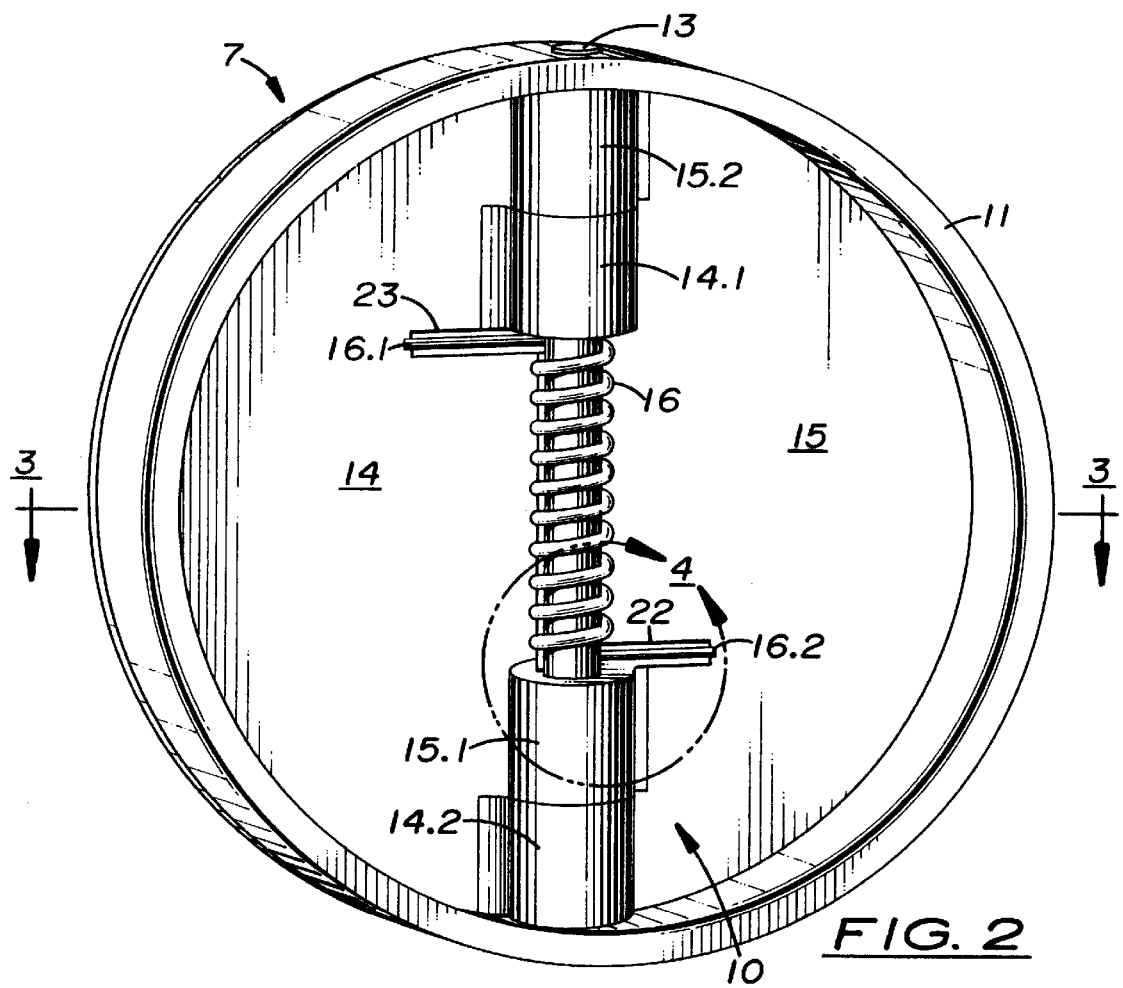
FIG. 2 is a perspective view of a first embodiment of the switch-over valve from its downstream side and shown in a closed position.

As most clearly apparent in FIG. 2, a middle portion of the pivot axle 13 of the switch-over valve 10 is exposed between the eyelets 14.1 and 15.1. The switchover valve 10 also includes biasing means such as in the form of a prestressed helical spring 16 disposed around the middle portion of the pivot axle 13. The opposite ends 16.1, 16.2 of the spring 16 respectively rest on the wings 14, 15 and impress the wings 14, 15 in the direction of closure from the opened position of FIG. 5 toward the closed position of FIG. 3. The spring force moments are sufficient to hold the wings 14, 15 in contact on the annular valve seat 12, as depicted in FIG. 3, at low throughflows that are not intended to enable the main meter device.

In order to ensure a tight seating of the wings 14, 15 on the annular valve seat 12, the switch-over valve 10 further includes a flat seal 17 made of a stretchible flexible material and disposed on the upstream side of wings 14, 15 of the divided flap covering a region (plane or line) of separation or division of the flap. With the wings 14, 15 in the closed position of FIG. 3, the outer edge of the flat seal 17 is clamped between peripheral edges of the wings 14, 15 and the annular valve seat 12. The flat seal 17 is secured form-fittingly on the wings 14, 15 of the divided flap by respective nubs 18, 19, seen in FIGS. 3 and 5, attached on the upstream sides of the wings 14, 15. In the region of these nubs 18, 19, the flat seal 17 is provided with longitudinal holes 20, 21 which extend on an imaginary line perpendicularly to the pivot axle 13. For securing the flat seal 17 on the nubs 18, 19, at the region of its longitudinal holes 20, 21 the flat seal 17 can be stretched transversely to the longitudinal extent of the holes 20, 21 so that they will fit over the wider heads of the nubs 18, 19 and behind which the flat seal 17 "snaps" in after it has passed over the nubs 18, 19.

Figure 5:
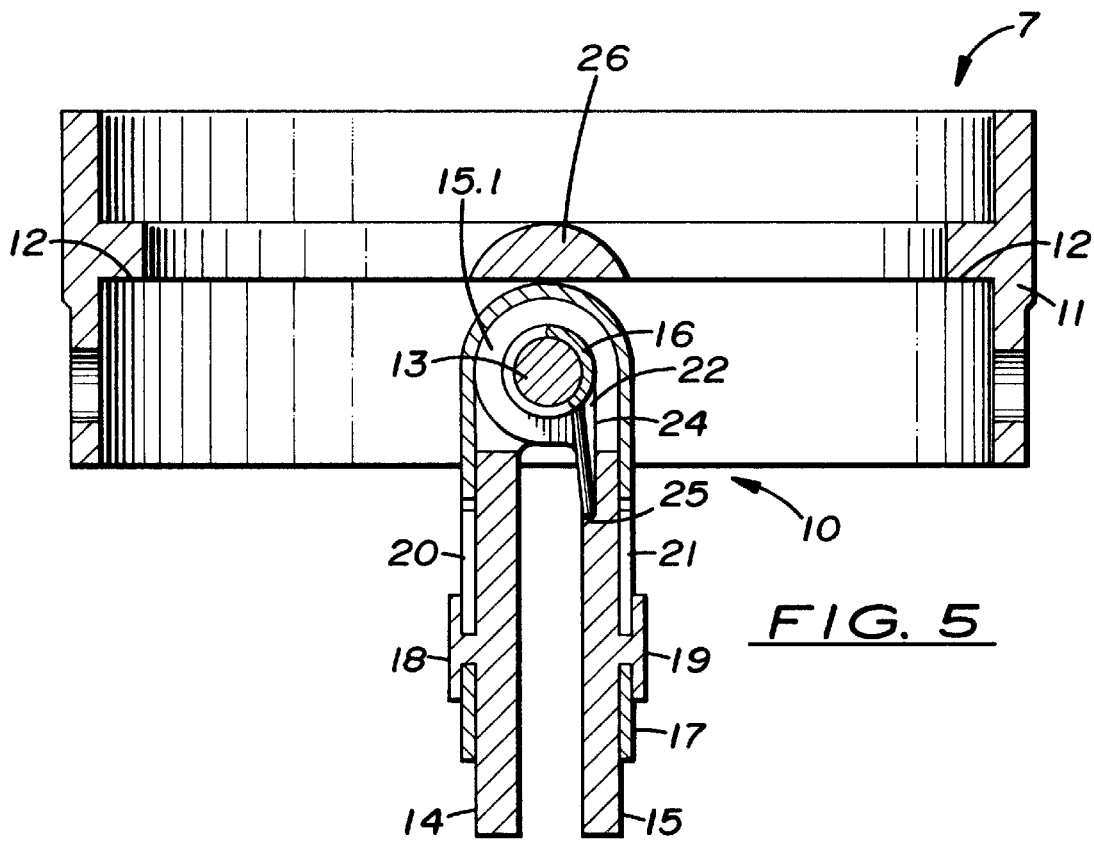
FIG. 5 is another cross-sectional view similar to that of FIG. 3 but showing the switch-over valve in the opened position.

When the wings 14, 15 of the divided flap are opening, the flat seal 17 is flexed about the pivot axle 13, respectively the eyelets 14.1, 14.2, 15.1, 15.2. thereover. This arrangement entailed an enlargement of the area covered by the flat seal 17 as the valve 10 opens toward the fully opened position of FIG. 5 compared to when the valve 10 is in the closed position of FIG. 3. If the flat seal 17 was rigidly fixed on the wings 14, 15 this would lead to a stretching of the flat seal 17. Fatigue tearing of the flat seal 17 would then only be a question of time. In addition, the water volume flow through the main meter device would in this case also need to have to overcome the restraining forces of the flat seal 17 on wings 14, 15 as well as the force of the spring 16. These disadvantages are avoided through the guidance of the flat seal 17 in the longitudinal holes 20, 21. Guided on the nubs 18, 19, the flat seal 17 at its peripheral edge can slide away from the edges of wings 14, 15, from the position shown in FIG. 3 inwardly to that shown in FIG. 5, whereby the enlargement of the area about the pivot axle 13 to be covered by the flat seal 17, as mentioned above, is compensated for without stretching of the material of the flat seal 17.

Figure 3:
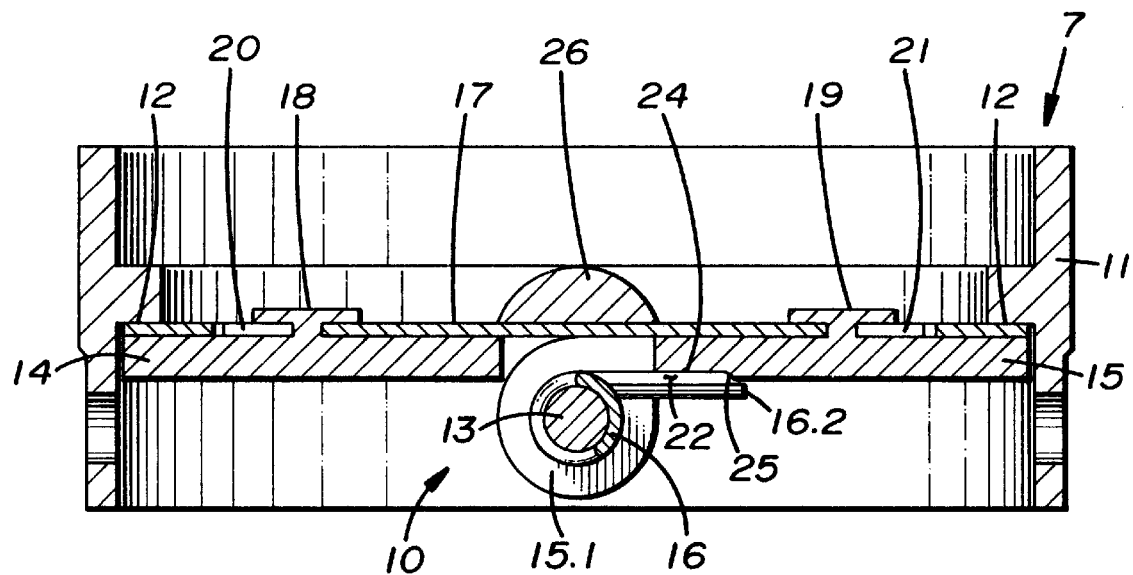
FIG. 3 is a cross-sectional view of the switch-over valve taken along line 3—3 of FIG. 2.

Furthermore, from the depiction of FIG. 3 it can also be realized that the switch-over valve 10 having the two wings 14, 15, the annular valve seat 12, the pivot axle 13, the flat seal 17 and the spring 16 is also excellently suited as a check valve in the event of a reverse flow. To secure the region of the pivot axle 13, which in this case is a problematic region in which gaps are present due to the construction of the divided flap forming the closure member as seen in the direction of the reverse flow, the switch-over valve 10 also includes a web 26 disposed behind the flat seal 17 opposite from the pivot axle 13. The flat seal 17 in the region of the pivot axle 13 cannot therefore be pressed away in the rearward direction in the event of a pressure impact from reverse flow through the throughflow cross section of the valve 10.

When the wings 14, 15 of the divided flap are pivotally moved toward the fully opened position of FIG. 5, the prestressed spring 16 is further tensioned. In other words, with increasing angle of opening of the wings 14, 15 the force moments acting from the helical spring 16 onto the wings 14, 15 in the direction of closing of the wings 14, 15 increase. This effect is undesirable since the wings 14, 15 should be allowed to open as far as possible to achieve low pressure losses. For this reason respective opposite ends 16.1, 16.2 of the spring 16 resting on wings 14, 15 are each guided in one of a pair of grooves 22, 23. The grooves 22, 23 extend in the radial direction and are formed into the wings 14, 15, respectively. The bottom 24 of each of the grooves 22, 23 is thus recessed with respect to the surface of the wings 14, 15. In the transition from the surface of wings 14, 15 to the groove bottom 24 an inclined plane 25 is provided inclined inwardly toward the pivot axle 13. This formation is most clearly evident in FIG. 4 which shows the association between the spring end 16.2 and the groove 22. The following explanations refer to this pairing. For the pairing spring end 16.1 and groove 23 the same applies analogously.

Figure 4:
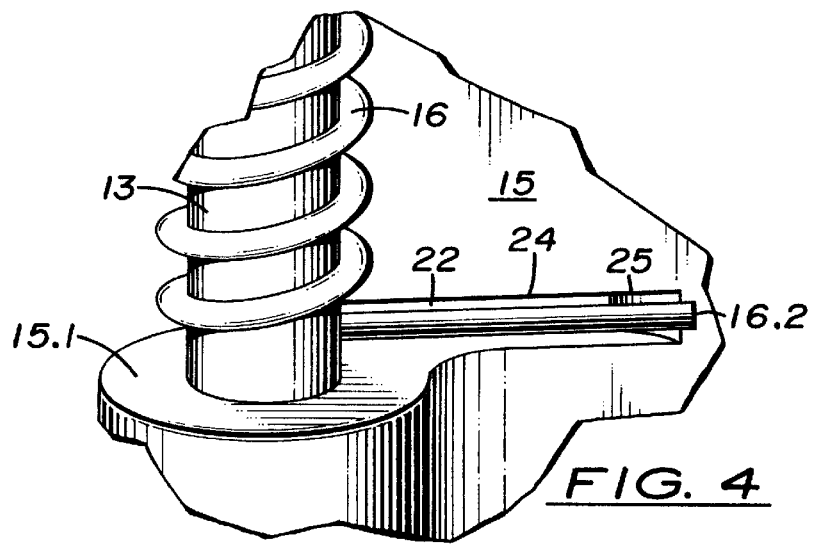
FIG. 4 is an enlarged detailed view of a portion of the switch-over valve enclosed by circle 4 of FIG. 2.

In FIG. 4, it is evident that with the wing 15 in the closed position of FIGS. 2 and 3, the spring end 16.2 is borne on the wing surface. If a specific throughflow quantity is reached, the wing 15 opens toward the opened position of FIG. 5. The spring 16 is therein flexed by a specific amount about the pivot axle 13, causing the length of spring 16 on wing 15 to shorten. With the increasing opening of the wing 15, the spring end 16.2 thereby is moved inwardly toward the pivot axle 13 onto the inclined plane 25 on which it slides backward opposite the direction of flow to the groove bottom 24. In this way the spring force which normally increases with the opening of wing 15 is compensated for and reduced.

Figure 6:
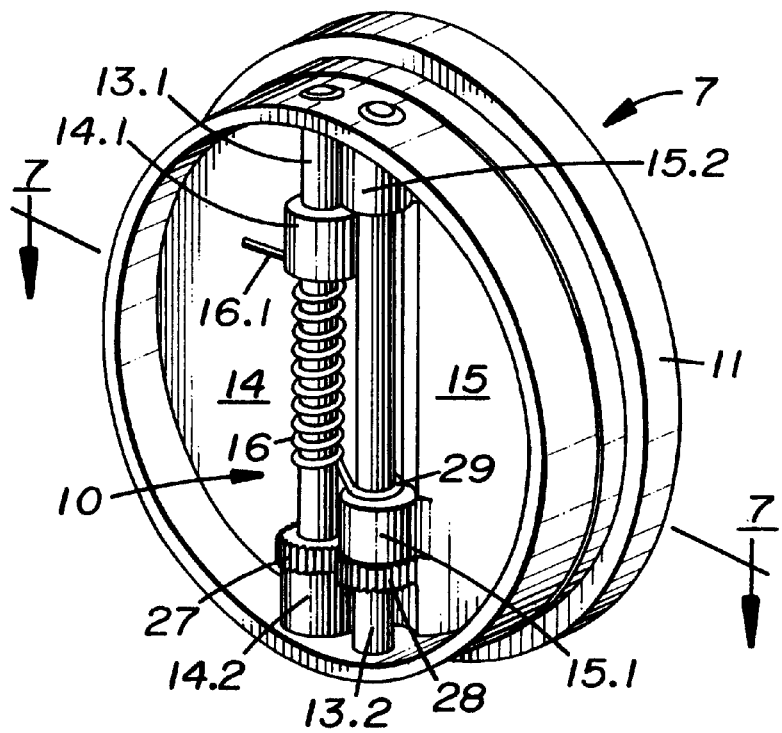
FIG. 6 is a perspective view of a second embodiment of the switch-over valve from its downstream side and shown in a closed position.
Figure 7:
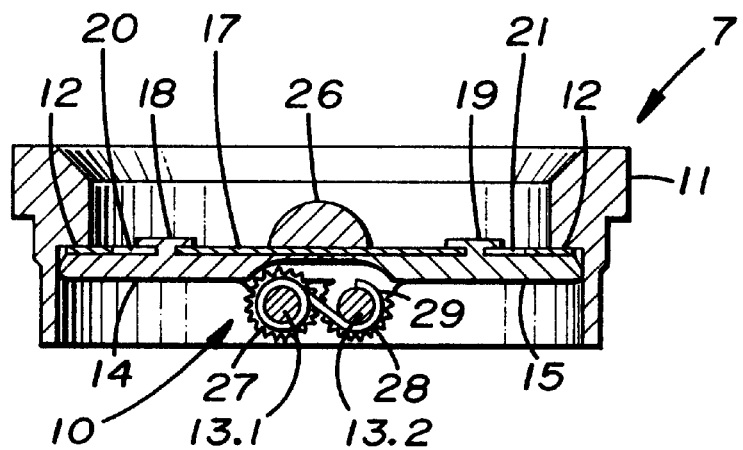
FIG. 7 is a cross-sectional view of the switch-over valve taken along 7—7 of FIG. 6.

Referring to FIGS. 6 and 7, there is illustrated a second embodiment of the change-over or switch-over valve 10 of the switch-over valve inset 7. In contrast to the above-described first embodiment of the switch-over valve 10 of FIGS. 2 to 5, the second embodiment employs two pivot axles 13.1, 13.2, a separate one for each of the two wings 14, 15. For mounting to the one pivot axle 13.1, the wing 14 is provided with a pair of eyelets 14.1, 14.2 defining respective hollow bores aligned with one another allowing the pivot axle 13.1 to penetrate therethrough. For mounting to the other pivot axle 13.2, the wing 15 is provided with a pair of eyelets 15.1, 15.2 defining respective hollow bores aligned with one another allowing the pivot axle 13.2 to penetrate therethrough.

Also, the second embodiment of the switch-over valve 10 includes a pair of gear wheels 27, 28 each being fixedly mounted on one of the pivot axles 13.1, 13.2. The teeth of the gear wheels 27, 28 are disposed in a mated or meshed relationship with one another so that each movement of one of the wings 14, 15 translates to the other of the wings 14, 15 whereby the movement of the wings 14, 15 are synchronized with one another due to the gear wheels 27, 28. In the event that uneven pressures are exerted on the wings 14, 15, such synchronization prevents one of the wings 14, 15 from closing or opening earlier than the other of the wings 14, 15 or prevents one of the wings 14, 15 from assuming a different angular position than the other relative to the fluid flow.

A further difference of the second embodiment from the first embodiment is that the end 16.1 of the spiral spring 16 only rests on the wing 14 whereas the other end 29 of the spiral spring 16 is held in place by the pivot axle 13.2. A direct resting of this other end 29 of the spring 16 on the wing 15 is not required because a force is exerted to this wing indirectly through the end 16.1 of the spring 16 by means of the mating gear wheels 27, 28.

Other than the above-noted differences, the second embodiment of the switch-over valve 10 is substantially identical in design and function with that of the first embodiment. Therefore, to avoid repetition, reference is can be made to the description of the first embodiment. Components identical in design and function are designated by the same reference numbers.

It is thought that the present invention and its advantages will be understood from the foregoing description and it will be apparent that various changes may be made thereto without departing from the spirit and scope of the invention or sacrificing all of its material advantages, the forms hereinbefore described being merely preferred or exemplary embodiments thereof.

I claim:

1. A switch-over valve for a compound water meter, comprising:
   (a) a housing defining a valve seat and throughflow cross section;
   (b) a pivot extending across said throughflow cross section of said housing and supported at opposite ends in opposed portions of said housing;
   (c) a closure member formed by a divided flap having a pair of wings articulated by said pivot for movement between opened and closed positions relative to said valve seat and throughflow cross section of said housing;
   (d) means for biasing said wings of said divided flap in a direction counter to a normal direction of flow through said throughflow cross section of said housing to said closed position preventing flow through said throughflow cross section but upon flow through said throughflow cross section of said housing exceeding a predetermined limit said biasing means also adapted for permitting said wings to move toward said opened position enabling flow through said throughflow cross section;
   (e) a flat seal of flexible material disposed on and at least partially covering an upstream side of said divided flap; and
   (f) a pair of nubs each respectively attached on one of said wings, said flat seal having a pair of longitudinal holes therein extending in a direction perpendicular to said pivot means, said longitudinal holes respectively receiving therethrough said nubs of said wings such that said flat seal is secured form-fittingly on said wings and at the same time guided by said nubs of said wings for movement relative thereto as said wings are moved between said opened and closed positions.

2. The valve of claim 1 wherein said wings of said divided flap are hingedly associated one with the other along and about said pivot disposed along a region of division of said divided flap.

3. The valve of claim 2 wherein said divided flap has gaps formed along said region of division thereof and thereby along said pivot.

4. The valve of claim 1 wherein said flat seal has a peripheral edge which forms a sealing relationship on said annular valve seat when said wings are moved to said closed position.

5. The valve of claim 1 wherein said flat seal has a peripheral edge which forms a sealing relationship on said annular valve seat when said wings are moved to said closed position, said peripheral edge of said flat seal being moveable toward and away from said sealing relationship with guidance of said flat seal by said nubs via said longitudinal holes in said flat seal.

6. The valve of claim 1 further comprising:
   a web disposed on an upstream side of said flat seal opposite said pivot such that said flat seal is held in close contact on said flap by said web.

7. The valve of claim 1 wherein said biasing means is at least one spring disposed on said pivot and having at least one of a pair of opposite ends resting on at least one of said wings and impressing a biasing force of said spring onto said wing that causes said wings to move toward said closed position.

8. The valve of claim 7 wherein each of said wings has a groove receiving one of said opposite ends of said spring transmitting said biasing force of said spring onto said wings, said groove being disposed and configured for guiding a respective one of said ends of said spring such that said spring force which normally increases with opening of said wings is compensated for and reduced.

9. The valve of claim 1 wherein said pivot is a common pivot axle to which said wings are mounted for pivotal movement relative to one another.

10. The valve of claim 1 wherein said pivot is a pair of separate pivot axles disposed in side-by-side relationship to one another, one of said pivot axles mounting one of said wings, the other of said pivot axles mounting the other of said wings.

11. The valve of claim 10 wherein said wings are coupled to each other such that said wings open and close in a synchronized relationship with each other.

12. The valve of claim 10 further comprising:
   a pair of gear wheels each being fixedly mounted to one of said pivot axles such that said gear wheels are disposed in a mating relationship with one another.

13. A switch-over valve for a compound water meter, comprising:
   (a) a housing defining an annular valve seat and a central throughflow cross section;
   (b) a pivot extending across said central throughflow cross section of said housing and supported at opposite ends in opposed portions of said housing;
   (c) a closure member formed by a divided flap having a pair of wings disposed along opposite longitudinal sides of said pivot and articulated by said pivot means for movement between opened and closed positions relative to said annular valve seat and said central throughflow cross section of said housing, said wings being hingedly associated one with the other along and about said pivot disposed along a region of division of said divided flap such that gaps are formed along said region of division of said divided flap and thereby along said pivot;

(d) a flat seal of flexible material disposed on and at least partially covering an upstream side of said divided flap and extending over said region of division of said divided flap;

(e) at least one pretensioned spring disposed on said pivot and biasing said wings of said divided flap in a direction counter to a normal direction of flow through said throughflow cross section of said housing to said closed position preventing flow through said throughflow cross section of said housing but upon flow through said throughflow cross section of said housing exceeding a predetermined limit said spring adapted for permitting said wings to move toward said opened position enabling flow through said throughflow cross section; and (f) a pair of nubs each respectively attached on one of said wings, said flat seal having a pair of longitudinal holes therein extending in a direction perpendicular to said pivot means, said longitudinal holes respectively receiving therethrough said nubs of said wings such that said flat seal is secured form-fittingly on said wings and at the same time guided by said nubs of said wings for movement relative thereto as said wings are moved between said opened and closed positions.

14. The valve of claim 13 wherein said flat seal has a peripheral edge which forms a sealing relationship on said annular valve seat when said wings are moved to said closed position.

15. The valve of claim 13 wherein said flat seal has a peripheral edge which forms a sealing relationship on said annular valve seat when said wings are moved to said closed position, said peripheral edge of said flat seal being moveable toward and away from said sealing relationship with guidance of said flat seal by said nubs via said longitudinal holes in said flat seal.

16. The valve of claim 13 further comprising:

a web disposed on an upstream side of said flat seal opposite said pivot such that said flat seal is held in close contact on said flap by said web.

17. The valve of claim 13 wherein said spring disposed on said pivot has at least one end resting on one of said wings and impressing a biasing force of said spring onto said wing that causes said wing to move toward said closed position.

18. The valve of claim 17 wherein each of said wings has a groove receiving one of said opposite ends of said spring transmitting said biasing force of said spring onto said wings, said groove being disposed and configured for guiding a respective one of said ends of said spring such that said spring force which normally increases with opening of said wings is compensated for and reduced.

19. The valve of claim 13 wherein said pivot is a common pivot axle to which said wings are mounted for pivotal movement relative to one another.

20. The valve of claim 13 wherein said pivot is a pair of separate pivot axles disposed in side-by-side relationship to one another, one of said pivot axles mounting one of said wings, the other of said pivot axles mounting the other of said wings.

21. The valve of claim 20 wherein said wings are coupled to each other such that said wings open and close in a synchronized relationship with each other.

22. The valve of claim 20 further comprising:

a pair of gear wheels each being fixedly mounted to one of said pivot axles such that said gear wheels are disposed in a mating relationship with one another.

* * * * *